Nov. 16, 1937.  E. WALDER  2,099,152
WAFFLE IRON
Filed Oct. 29, 1934  2 Sheets-Sheet 1
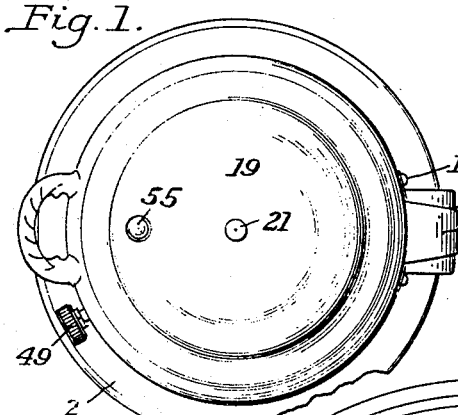
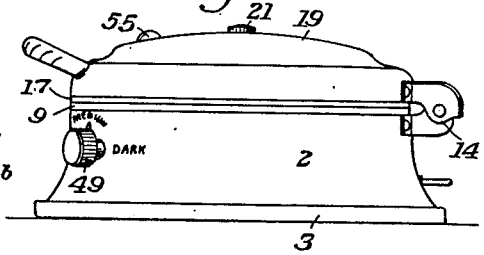
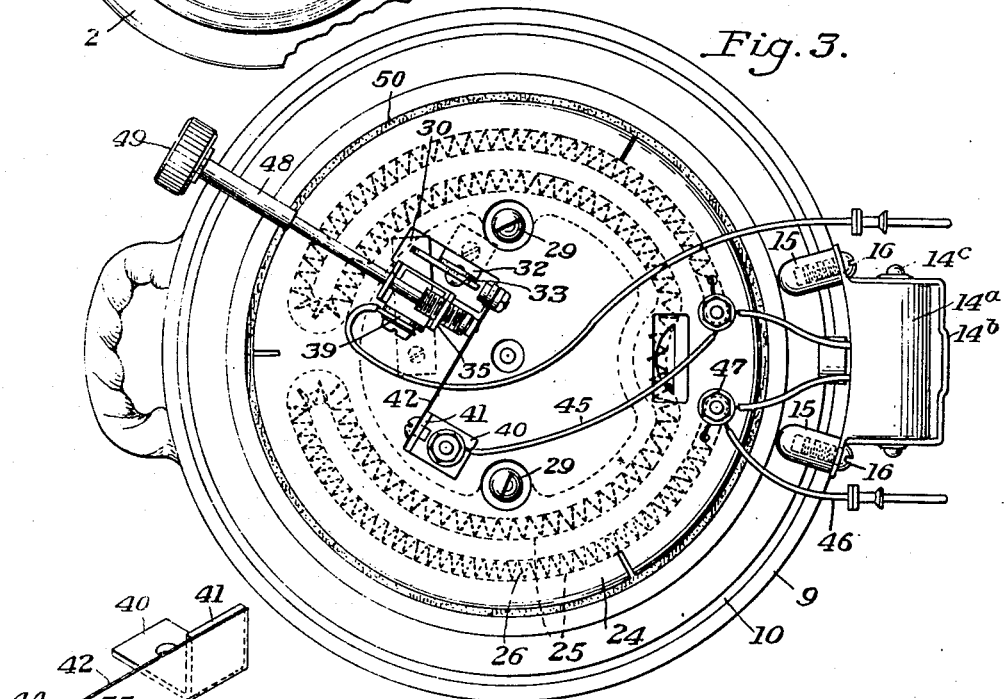
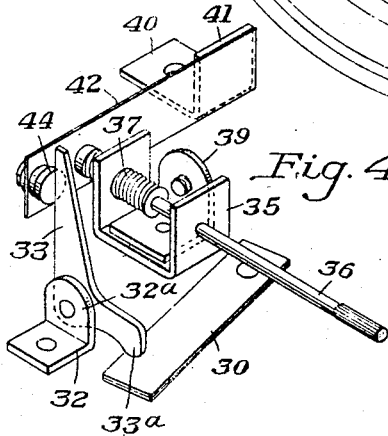
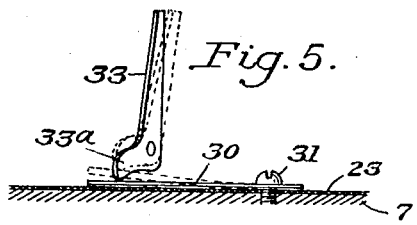
INVENTOR
Emil Walder
by his attorneys Nov. 16, 1937.   E. WALDER   2,099,152
WAFFLE IRON
Filed Oct. 29, 1934   2 Sheets-Sheet 2
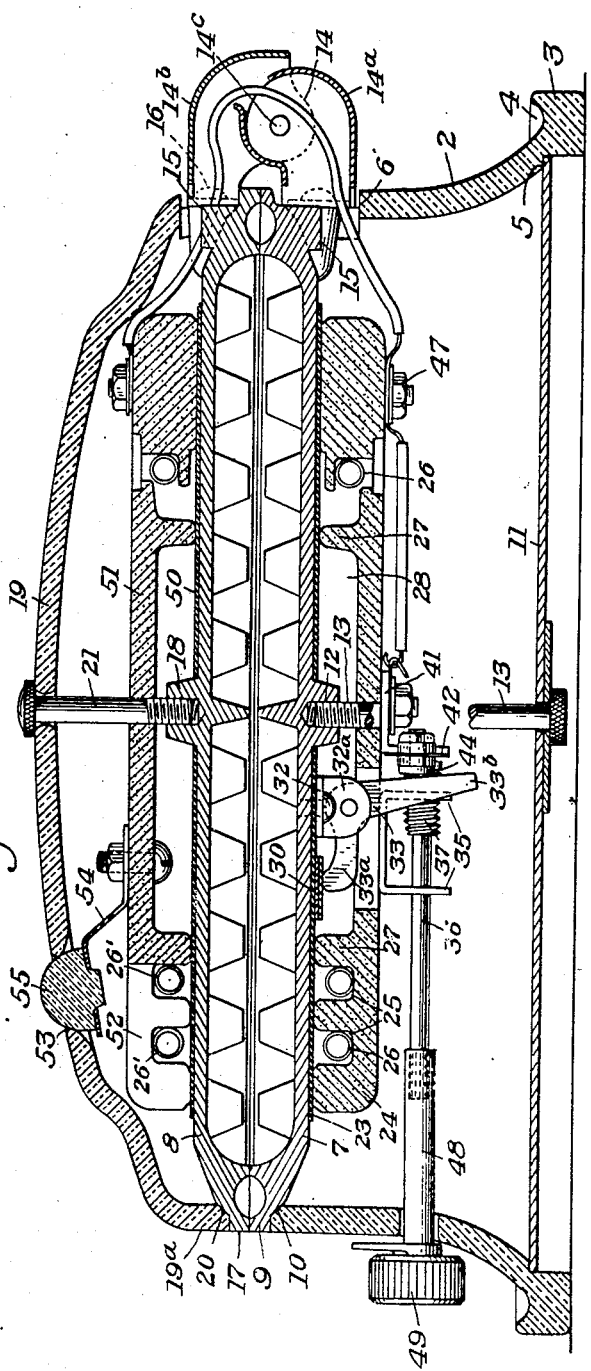
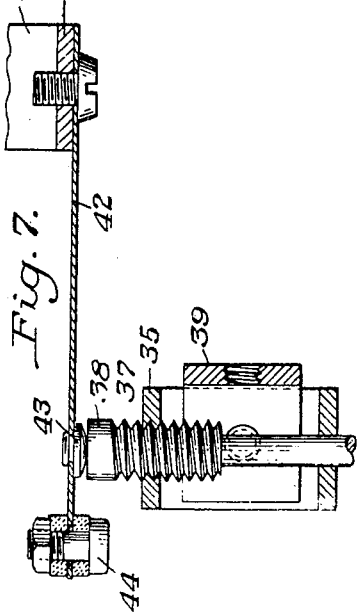
INVENTOR
Emil Walder
by his attorneys Patented Nov. 16, 1937

2,099,152

UNITED STATES PATENT OFFICE 2,099,152

WAFFLE IRON

Emil Walder, Greensburg, Pa., assignor to Porcelier Manufacturing Company, Greensburg, Pa., a corporation of Pennsylvania Application October 29, 1934, Serial No. 750,420

2 Claims. (Cl. 219—19)

This invention relates to electrically heated cooking appliances and is for an improvement in waffle irons and like devices.

The conventional waffle iron comprises upper and lower grid members each contained within a metal housing, the upper and lower members being connected together through a hinged connection. In place of the usual metal cover or housing for the grid members, the present invention contemplates the use of metal grids in a structure which is otherwise formed of a frangible material such as porcelain, earthenware or, if desired, glass. According to the present invention, the arrangement is such that the grids and the frangible portions are assembled in a simple and efficient manner, the grids are so connected through a hinge connection that the frangible material is relieved of any connection with the hinge at all, and the waffle iron can be cheaply and economically manufactured with relatively little breakage.

The invention further provides a waffle iron having a thermostatically controlled switch for the electric heating elements, the switch being adjustable to vary the cooking time for the waffle, the thermostatic switch arrangement being of a simple form which can be cheaply manufactured and which will be reliable in operation.

The invention further provides a waffle iron in which there is a visible indicator to show when the iron has heated up to a baking temperature and to indicate when the waffle should be removed.

The invention may be readily understood by reference to the accompanying drawings, in which Figure 1 is a top plan view of the complete assembly;

Figure 2 is a side elevation of the waffle iron shown in Figure 1;

Figure 3 is a bottom plan view on a larger scale than Figure 2, the bottom plate being removed to show the heat-responsive or thermostatic switch.

Figure 4 is a detail inverted perspective view of the thermostatic switch assembly;

Figure 5 is an inverted detail view showing the thermostatic strip and the elbow lever which cooperates therewith;

Figure 6 is a transverse section through the complete assembly, the drawing being substantially a full scale drawing, and Figure 7 is another detail view showing a portion of the thermostatic switch.

In the drawings, 2 designates an enclosing base member of frangible material, such as porcelain, earthenware or glass. It is shown as having a foot portion 3 in the top of which is an annular trough 4. Formed on the inner wall of the base member 2 is an inverted shoulder 5. The top of the body 2 is provided at one part in its periphery with a deep notch or cut-away portion 6. Set onto the top edge of the base member 2 is the metal grid structure comprising a lower grid member 7 and an upper grid member 8. The grid member 7 is provided with an annular lip portion 9 which rests on the top edge of the base member 2, the metal grid and the base member 2 preferably having contacting beveled surfaces at 10 so as to hold the grid member 7 centered with respect to the member 2. Extending across the bottom of the base 2 and confined against upward movement by the shoulder 5 is a metal plate 11. A single bolt, preferably a thumb screw having a knurled head as shown, is loosely passed through a central hole in the plate 11 and has its inner end screwed into a threaded socket 12 on the under side of the grid 7, the bolt being designated 13. When the bolt 13 is screwed into the socket 12 until it resists further turning movement, the lower grid member 7 is pulled down against the top edge of the base 2, and by reason of this arrangement the single bolt 13 serves to effectively hold the entire grid structure on the frangible base member in such manner that no breaking strains are concentrated at any point in the frangible base member, and in such manner that the whole structure can be easily taken apart by the removal of the one bolt, to replace a broken part or to repair a part to which it is necessary to gain access.

The two grid members 7 and 8 are connected through a hinge designated generally at 14. The hinge comprises a lower leaf or member 14a and an upper leaf or member 14b, the two being connected by a pintle 14c. The grids 7 and 8 are provided with integral lugs 15. Screws designated 16 pass through ears formed on the leaves of the hinge, into these lugs. The two cast metal grid members are thus connected to each other directly through the hinge while the hinge is entirely clear of the base member 2, the notch or cut-away portion 6 providing the necessary clearance for the lugs 15 and for the cooperating portions of the hinge.

The upper grid member 8 is provided with an annular lip or flange 17 and with a central threaded socket 18. A frangible cover 19 of the same material as the base 2 is positioned over the upper grid member 8. It has a downwardly turned flange portion 19a that engages the lip 17 on the edge of the grid member, and at 20 there are cooperating beveled surfaces on the flange 19a of the grid. A single bolt 21 similar to the bolt 13 loosely passes through a central hole in the top of the cover 19 and is threaded into the socket 18. This single bolt serves as the sole means for connecting the frangible cover member to the upper grid member. When the bolt 21 is screwed down into the socket 18, the lip 17 and the flange 19a are drawn tightly into contact so that the cover member 19 is tightly clamped against the grid member 8 on which it is carried. The cover member 19 is cut away or notched at 22 to clear the hinge which connects the two grids and to clear the lugs 15 on the upper grid. By reason of this arangement the frangible upper cover member, like the frangible base member 2, is entirely clear of the hinge.

From the foregoing, it will be seen that the invention provides an assembly of a frangible enclosing structure with metallic grids, which is easily assembled, two screws 13 and 21 being the only elements necessary for securing the various parts together. The arrangement is one in which the upper edge of the base member 2 and the lower edge 19a of the cover member 19 are protected by the metal lips 9 and 17 of the grids 7 and 8, respectively. The arrangement, moreover, is one in which the hinged connection is effected directly between the grids, and the frangible cover members 2 and 19 are entirely clear of the hinge and free of the strains which the hinge imposes, particularly when the upper grid is thrown back to open the waffle iron in the customary manner.

On the under side of the metal grid 7 is a sheet of asbestos or other heat-resisting electrical insulating material, this sheet of asbestos being designated 23. Secured to the under side of the member 7 below the sheet of insulation 23 is an insulating disc 24 and which is preferably of a ceramic nature. The disc 24 is provided with grooves 25 in which the electric resistance wires 26 for heating the lower grid member are contained. It will be noted that there is an inner annular rib 27 on the lower disc 24 providing a central chamber 28 above the disc 24 and below the sheet 23. The insulating disc 24 is held in place by two screws or bolts 29 (see Figure 3). The disc 24 is provided with a single central opening through which the bolt 13 freely passes.

Secured to the under side of the grid member 7 within the chamber 28 is a thermostatic strip 30, the strip being tightly secured to the grid member at one end by means of a small screw 31 (see Figure 5), the other end of the strip being free. The strip, which may be of a bi-metallic nature, is so affected by heat that as the temperature of the grid increases the free end of the strip moves or curls away from the face of the grid on which it is mounted. Attached to the under side of the base member 7 also within the chamber 28 is a supporting member 32 having a foot portion which bears against the under side of the plate 7 and is secured thereto by a small screw and having a vertical lug portion 32a thereon. This supporting member 32 provides a pivotal support for an elbow lever 33, the elbow lever 33 being pivotally mounted on the lug portion 32a by a suitable pivot pin or small rivet. The shorter horizontal arm 33a of the elbow lever bears against the under surface of the thermostatic strip 30 near the free end of said strip, while the longer vertical arm 33b of said lever projects downwardly through a slot in the disc 24.

Secured to the lower surface of the ceramic disc 24 is an inverted yoke member 35 having two depending arms. One of these depending arms provides a bearing for a small rotatable shaft 36, while the other depending lug, i. e., the one nearest the center of the assembly, is threaded for cooperation with the coarse thread 37 on the end of the shaft 36. At the outer end of the threaded portion 37 is a contact portion 38. The yoke member 35 also carries a bracket 39 to which one of the electric supply wires can be attached by means of a terminal screw or bolt. Such bolt is not shown in Figure 7, but can be seen in Figure 3.

Secured to the under side of the ceramic disc 24 is another bracket member 40 having a depending arm 41 to which is secured a spring contact arm 42. The arm 42 carries a contact button 43 for cooperation with the contact 38 on the end of the shaft 36. It also carries a small bolt 44 at its outer end, the bolt 44 preferably being electrically insulated from the end of the arm 42. The smooth head of the bolt 44 is positioned for cooperation with the vertical arm 33b of the elbow lever 33.

As previously indicated, one side of an electric supply circuit attaches to the bracket member 39 so that current may flow into the shaft 36 and contact 38. When the button 43 on the arm 42 is bearing against the member 38, current may flow along the member 42 into the member 40. A wire attaches to the member 40 as shown in Figure 3, such wire being designated 45, and it connects to one end of the electric heating wire 26. The other side of the electric circuit is completed through wire 46 attached at 47 to the opposite end of the heater wire 26, as is shown in Figure 3.

The end of the shaft 36 is roughened or knurled as shown in Figure 4. The purpose of this is to provide a friction joint for a sleeve 48 which is forced over the end of the shaft 36 and which passes through an opening in the side wall of the base member 2 and which has a knob and indicator 49 at its outer end. With this arrangement, the waffle iron can be assembled, the thermostat calibrated, and then the sleeve 48 forced into place and slippage between the sleeve 48 and the shaft 36 will not thereafter occur. Should further relative adjustment of the thermostat with respect to the knob and indicator 49 be necessary, the sleeve 48 can be pulled out, the knob 49 adjusted and the sleeve 48 replaced.

The operation of the thermostatic switch may now be followed. As the lower grid member becomes hot, the thermostatic strip 30 tends to move downwardly as viewed in Figure 6, or upwardly as viewed in the inverted view of Figures 4 and 5. This rocks the elbow lever 33. The motion of the lever 33 is transmitted through the arm 33b to the spring contact member 42, tending to force the contact button 43 away from the contact 38 on the shaft 36. As soon as the contact button 43 moves out of contact with the contact 38 the circuit through the heating wires is broken. When the grid is chilled by the pouring of the waffle batter into the waffle iron, the thermostatic strip 30 moves in the opposite direction and the spring arm 42 moves the button 43 back into contact with the contact 38. At the same time, the spring arm 42 serves to hold the short arm 33a of the elbow lever in contact at all times with the thermostatic strip 30 so that there can be no rattling or vibrating. The closing of the circuit through the contact 38 and button 43, of course, causes the waffle iron to heat up again and this heating continues until the waffle iron reaches a predetermined degree at which the waffle will be done, and thereupon the current will again go off. By turning the knob 49, the contact 38 can be adjusted longitudinally with respect to the button 43. Adjustment in one direction causes the thermostat to open more quickly, while adjustment of the contact in the other direction retards the opening of the switch.

It will be noted from the foregoing description that the thermostatic strip and the elbow lever operated thereby are mounted in the chamber 28 and that the thermostatic strip is relatively remote from the heating wires. Furthermore, the thermostatic strip is protected from direct radiation of heat from the heating wire by reason of the annular rib or partition 27 on the ceramic plate 24. By reason of this arrangement the thermostatic strip will only operate to open the circuit to the heating wires when the grid 7 has by conduction of heat through it become sufficiently hot to cook the waffle. Were it not for the partition 27 the strip would be exposed to direct radiation of heat from the resistance wire, and operation might be effected before the whole surface of the grid had become sufficiently hot. It will furthermore be noted that the asbestos sheet 23 extends under the thermostatic strip, passing between the thermostatic strip and the metal of the grid. This too protects the thermostat against premature operation, as heat is not conducted to the thermostatic strip as fast as it would be if the asbestos sheet 23 were omitted. By mounting the bolt 44 on the flexible contact strip 42 in such manner that it is insulated from the metal of the strip, a safety factor is provided by reason of the fact that if a short circuit should develop whereby one of the heating wires 26 contacted with the metal grid 7, current could not flow through the elbow lever from the metal plate into the contact arm 42 and prevent the device from shutting off. Likewise, it prevents current from traveling under normal conditions from the contact strip 42 through the elbow lever into the metal plate 7. There would be danger of electric shock to the person who happened to touch the metal plate 7 if the person touching the plate were not properly insulated from the ground as, for instance, where the device might be used in a basement kitchen. If one side of the line were allowed to conduct current to the metal plate 7, a person pouring wet batter into the mold from a metallic spoon might have a severe shock if that person happened to be in contact with a ground.

On the upper grid plate 8 there is also an asbestos sheet 50 and a ceramic disc 51, held in place by screws similar to the screws 29 of Figure 3. This ceramic plate is provided with channels for receiving the heating wires, designated 26'. The heating wires 26' are connected in parallel with the heating wires 26 so that they are controlled also by the thermostatic switch. The plate 51 is provided at one portion in its periphery with a notch or slot 52. In the cover 19 is an opening 53 which is located directly above the slot 52. A resilient metal bracket 54 secured on the plate 51 supports a transparent glass button or "jewel" 55 in the opening 53. When the waffle iron is operating and the thermostatic switch is closed, the heating wires 26' are heated to a red heat. The light from the heated wire can pass through the opening 53, and pass through the jewel 55. The operator using the waffle iron, in the ordinary use of it, plugs the iron into an electrical outlet. The heating wires are immediately brought to incandescence and a light is visible through the jewel 55. When the temperature of the waffle iron has reached a baking temperature, the thermostatic switch opens and the wires 26' instantly cool, so that no light is visible through the jewel 55, and the operator thereby knows that the iron is up to a baking temperature. When the waffle batter is poured in, chilling the grids, the thermostatic switch again closes, the wires 26' again are heated to a point where they emit light and they remain hot until the waffle is baked, i. e., until the grids have again reached a predetermined temperature, when the thermostat again shuts off and the operator knows that the waffle is done.

The manner of supporting the jewel in the cover is one which can be cheaply and easily assembled, and the entire arrangement whereby the heating wire is used as a source of illumination for the jewel, provides an indicating means of a very positive and yet economical type.

The advantages of using a frangible base material and a frangible cover for housing the grids are several. The frangible material can be variously decorated to conform for instance, to the decoration on other pieces of chinaware or porcelain, or the cover may have a color of any desired hue or combination of colors not practical with metals. Moreover, porcelain or other frangible material keeps its appearance without requiring polishing, and it does not become scratched, whereas the bright metals heretofore commonly used easily become tarnished or marked where waffle dough dries or bakes onto the cover. Aside from these advantages of appearance, the waffle iron can be set on a piece of good furniture or table without any insulating pad under it, as the base 2 is a poor conductor of heat and the foot portion 3 does not become sufficiently hot in use to scorch or mar the finish of the furniture. Moreover, the frangible cover 19, being a poor conductor of heat, does not radiate heat into the room at the same rate that the conventional metal covering does. While it has heretofore been proposed to use frangible materials to some extent in waffle irons, the structures heretofore provided have been such as to render the assembly quite expensive and frequently to impose strains on the frangible material, such as result in easy breakage.

It will be understood that in the accompanying drawings I have shown one specific embodiment of the invention, but that various changes and modifications may be made in the shape and design and in the arrangement of various elements within the contemplation of my invention and under the scope of the following claims.

I claim:

1. A waffle iron or the like comprising a metallic grid member, an electric heater therefor, a ceramic disc under the grid member supporting the electric heater, a thermostatic strip secured to the grid member on the under surface thereof arranged to be affected by the heat of the grid, an elbow lever pivotally supported on the bottom of the grid having an arm engaging said strip, the other arm of said lever passing through an opening in the ceramic disc, a resilient contact bar mounted on the bottom of the ceramic disc and engaging the other arm of said elbow lever and resisting movement of the lever and serving to hold the first arm of the lever in contact with the thermostatic strip, a contact member mounted on the bottom of the ceramic disc toward which the contact bar is urged by its resilience and away from which it is moved by said lever under actuation of the thermostatic strip.

2. A waffle iron or the like comprising a metallic grid member, an electric heater therefor, a ceramic disc under the grid member supporting the electric heater, a thermostatic strip secured to the grid member on the under surface thereof arranged to be affected by the heat of the grid, an elbow lever pivotally supported on the bottom of the grid having an arm engaging said strip, the other arm of said lever passing through an opening in the ceramic disc, a resilient contact bar mounted on the bottom of the ceramic disc and engaging the other arm of said elbow lever and resisting movement of the lever and serving to hold the first arm of the lever in contact with the thermostatic strip, a contact member mounted on the bottom of the ceramic disc toward which the contact bar is urged by its resilience and away from which it is moved by said lever under actuation of the thermostatic strip, a threaded support on the bottom of the ceramic disc, said contact member being carried on an element which is threaded through said support and which is accessible remotely from the thermostat for adjusting the position of the contact member with respect to the contact bar.

EMIL WALDER.